United States Patent [19]
Willach et al.

[11] 3,721,217
[45] March 20, 1973

[54] WASTE HEAT BOILER FOR HEAT FURNACES

[75] Inventors: Rudolf Willach, Oberhausen; Aruth Rafael, Wesel, both of Germany

[73] Assignee: Deutsche Babcock & Wilcox Aktiengesellschaft, Oberhausen, Rhineland, Germany

[22] Filed: July 13, 1971

[21] Appl. No.: 163,538

[30] Foreign Application Priority Data

July 21, 1970 Germany.....................P 20 36 061.6

[52] U.S. Cl.....................................122/379, 165/84
[51] Int. Cl.................................................F22b 37/48
[58] Field of Search...........................122/379; 165/84

[56] References Cited

UNITED STATES PATENTS

| | | | |
|---|---|---|---|
| 2,183,496 | 12/1939 | Peters | 165/84 |
| 2,550,676 | 5/1951 | Dalin | 165/84 X |

FOREIGN PATENTS OR APPLICATIONS

| | | | |
|---|---|---|---|
| 1,045,678 | 7/1953 | France | 165/84 |

Primary Examiner—Kenneth W. Sprague
Attorney—Allison C. Collard

[57] ABSTRACT

A heat waste boiler having a waste gas duct in which two bundles of coiled pipes are mounted. The pipes are provided with vibrators for removing collected dust particles from the pipes, and thermostatic elements for measuring the temperature behind each cluster of pipes. The vibrators are independently controlled to remove the dust particles collected on the pipes.

5 Claims, 3 Drawing Figures

PATENTED MAR 20 1973
3,721,217
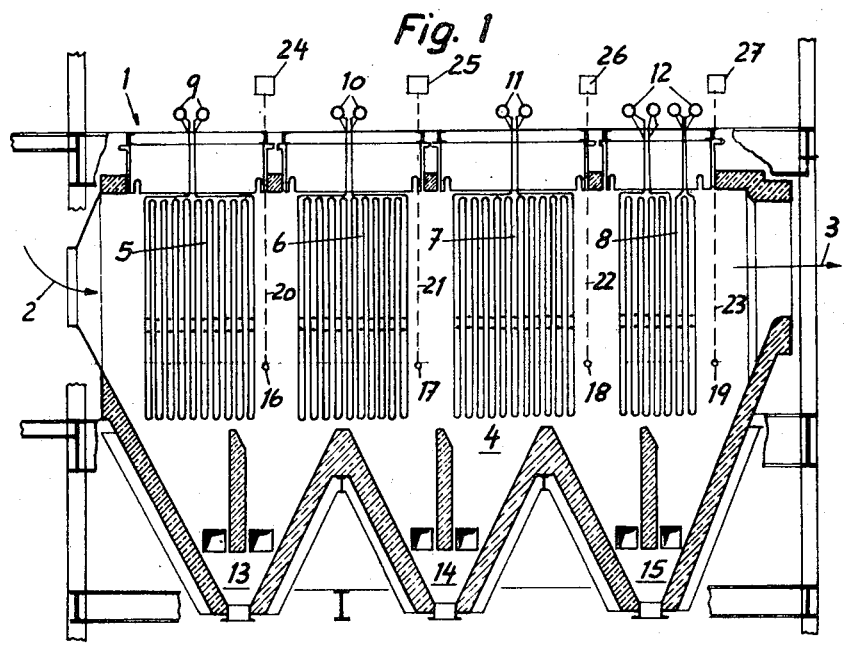
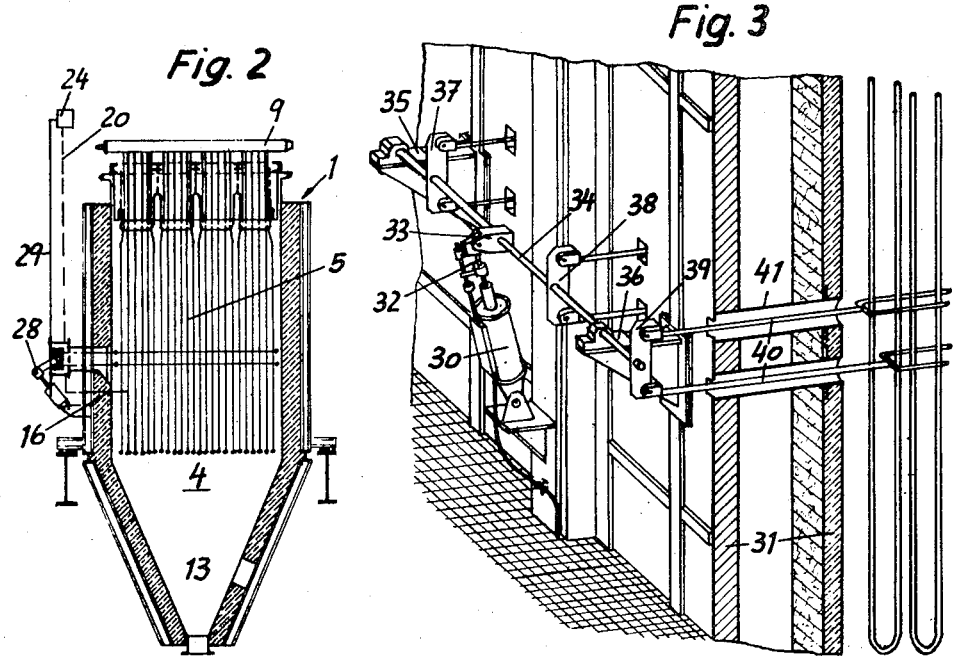

WASTE HEAT BOILER FOR HEAT FURNACES

The present invention relates to a waste heat boiler for waste gases having a high density of dust particles, and in particular, to a waste heat boiler for heat furnaces in which a waste gas duct having a pair of bundles or clusters of coiled pipes is mounted therein.

Heat furnaces are often used to remove the sulfidic ores from sulfur. The extracts obtained from the heated material consist of solid ore oxide and $SO_2$ gas, which is later converted to sulfuric acid. The gases emitted from the heat furnace contain dust particles ranging in density of up to 350 gram/$Mm^3$. Before the $SO_2$ gas enters an electro-filter, and prior to converting the $SO_2$ into $H_2SO_4$, the gas must be cooled to about 350°C in the waste heat boiler.

The waste heat boiler may be mounted in series with a whirling heat furnace, which consists of two adjacent vertical waste gas ducts. In the first of these ducts, the waste gas flows vertically downwardly, and in the second of these ducts, the gas flows vertically upwardly. The coil pipes are mounted in the vertical gas ducts so that they are parallel with respect to the flow of the waste gas. In order to prevent dust collection on the coiled pipes, dust blowers or vibrators are employed. Dust blowers are not suitable for waste heat boilers since the air movement causes a reduction in the $SO_2$ gas concentration. This then requires additional processing apparatus, such as a larger electro filter. Vibrators are usually actuated at predetermined time intervals. Thus, the density of the particles is not considered. As a result, if there is a sudden increase in the dust particle density of the gas which leaves the waste heat boiler, the temperature in the electro filter and other apparatus may rise to damaging levels, in which case, the entire system must be shut down to prevent damage. Thus, if the vibration time intervals are made short to prevent an increase in the temperature of the waste gas, the vibrator may operate when no dust collection is actually present. Another disadvantage of the vibrators is that a localized vibration to remove particles is not possible. Frequent activation of the vibrator also reduces its useful life.

Accordingly, the present invention provides a heat waste boiler having a waste gas duct in which two bundles of coiled pipes are mounted. The pipes are provided with vibrators for removing collected dust particles, and a thermostatic element for measuring the temperature behind each cluster of pipes. Each of the elements is provided with a control for controlling the vibrators. With this system, it is possible to clean each cluster of pipes independently. Thus, if the temperature behind one cluster of pipes rises to a level that is not safe, the vibrator behind the pipes where the increase of temperature occurs is automatically activated.

In one embodiment of the invention, pulling rods for vibrating the pipes are provided and are cooled. The cooling may be achieved by constructing the pulling rods as part of the bundles of coiled pipes. The heat transfer of the pipes of the invention is increased since the waste gas duct is horizontally disposed and the coiled pipes are disposed vertically, perpendicular to the direction of the gas flow. Thus, the waste gas exit speed need not be very high, thereby reducing the wear on the clusters of pipes.

It is therefore an object of the present invention to provide a waste heat boiler in which damaging rises of temperature during operation are prevented.

It is another object of the present invention to provide a waste heat boiler in which localized removal of dust particles by vibration from the apparatus thereof is possible.

It is a further object of the present invention to provide a waste heat boiler which is simple in design, easy to manufacture, and efficient and reliable in operation.

Other objects and features of the present invention will become apparent from the following detailed description taken in connection with the accompanying drawings which disclose one embodiment of the invention. It is to be understood, however, that the drawings are designed for the purpose of illustration only and not as a definition of the limits and scope of the invention.

In the drawings, wherein similar reference characters denote similar elements throughout the several views:

FIG. 1 is a longitudinal, cross-sectional view of a waste heat boiler constructed in accordance with the present invention;

FIG. 2 is a front cross-sectional view of the waste heat boiler shown in FIG. 1; and FIG. 3 is an enlarged perspective view of a vibrator of the present invention.

Referring to the drawings, waste gases flow through waste heat boiler 1 in the direction of arrows 2 and 3. The waste gas duct 4 is disposed horizontally parallel to the gas flow through the pipe. The bundles of coiled pipes 5–8 are disposed vertically, perpendicular to the gas flow, and are charged by collector means 9–12 disposed above waste gas duct 4. The dust funnels 13–15 are disposed beneath the coiled pipes, and thermostatic elements 16–19 are mounted behind each of the bundles of coiled pipes. The thermostatic elements are connected to control means 24–27 which control the vibrators through feed lines 20–23.

In FIG. 2, one of the four vibrators 28 of the apparatus is shown connected to its associated control means 24 by feed line 29.

An enlarged perspective view of shaking means 28 is shown in FIG. 3. The hydraulic cylinder 30 is mounted with its lower end affixed to the wall of the heat waste boiler. The piston arm 32 extends above the upper rim of the cylinder and is connected to a shaft 34 by lever 33. Shaft 34 is mounted on supports 35 and 36 which are secured in the walls of the waste heat boiler. Levers 37 and 39 are provided on shaft 34, and have their free ends connected to a pulling rod 40 which extends through an opening 41 provided in the wall 31 of the waste heat boiler and engages the associated coiled pipes. The reciprocating movement of the piston rod 32 transmits a reciprocating movement to the coiled pipes to dislocate collected dust particles.

By providing a superheater in the waste heat boiler, the heat conduction of the superheat faces, the steam temperature, and the amount of dust particle collection can be controlled. If the temperature of the steam is too high, then the heat faces will require frequent cleaning. If the steam temperature is too low, the reverse effect occurs, and when the desired temperature is reached, the vibrator is turned off.

While only one embodiment of the present invention has been shown and described, it will be understood to

What is claimed is:

1. A waste heat boiler for heat furnaces, for processing waste gases having a high density of dust particles, comprising;
   a horizontally disposed waste gas duct having openings disposed at each end thereof,
   a plurality of bundles of coiled pipes, mounted perpendicularly to the flow of the waste gas in said waste gas duct,
   means for measuring the temperature of the waste gas adjacent each bundle of said coiled pipes,
   means for vibrating each of said bundles of said coiled pipes independently to remove collected dust particles from said pipes, and
   means, responsive to said temperature measuring means, for controlling said vibrating means and vibrating said coiled pipes when the temperature of the waste gas adjacent said pipes reaches a predetermined value.

2. The waste heat boiler as recited in claim 1, wherein said vibrating means comprises;
   a plurality of elongated rods coupled to said coiled pipes,
   a plurality of pivotable levers mounted on said waste gas duct and coupled to the free ends of said plurality of elongated rods, and
   a piston, affixed at one end to the wall of the heat waste boiler and coupled at the other end to said levers, for reciprocating said levers and said plurality of elongated rods and thereby vibrating said coiled pipes to remove collected dust particles.

3. The waste heat boiler as recited in claim 2, wherein said elongated rods are integrally formed with said bundles of coiled pipes so as to cool said elongated rods during operation of the waste heat boiler.

4. The waste heat boiler as recited in claim 3, wherein said temperature measuring means is a thermostat, and wherein said control means is a switch, coupled to said thermostat and to said piston, for reciprocating said plurality of coiled pipes in each of said bundles independently when the temperature of waste gas adjacent thereof reaches a predetermined level.

5. The waste heat boiler as recited in claim 4 further comprising a plurality of dust funnels disposed beneath said bundles of coiled pipes for collecting dust particles shaken loose from said pipes during vibration thereof.

* * * * *